March 18, 1969    H. M. STEVENS    3,433,601
CONDENSED PHOSPHORUS TRANSFER BY RECYCLED
TURBULENT PHOSPHOROUS STREAM
Filed Oct. 7, 1965

INVENTOR
HARRY M. STEVENS
BY

ATTORNEY

United States Patent Office 3,433,601
Patented Mar. 18, 1969

3,433,601
CONDENSED PHOSPHORUS TRANSFER BY RE-
CYCLED TURBULENT PHOSPHOROUS STREAM
Harry M. Stevens, St. Louis, Mo., assignor to Monsanto
Company, St. Louis, Mo., a corporation of Delaware
Filed Oct. 7, 1965, Ser. No. 493,848
U.S. Cl. 23—293                                      2 Claims
Int. Cl. C01b 25/04

ABSTRACT OF THE DISCLOSURE

Phosphorus is recovered from a stream containing gaseous phosphorus and impurities by passing the stream to a condensing zone and indirectly cooling the stream in that zone to condense liquid phosphorus. The liquid phosphorus is exited to a collecting zone into a stream of recycled liquid phosphorus moving under turbulent flow conditions.

---

Figure 2:
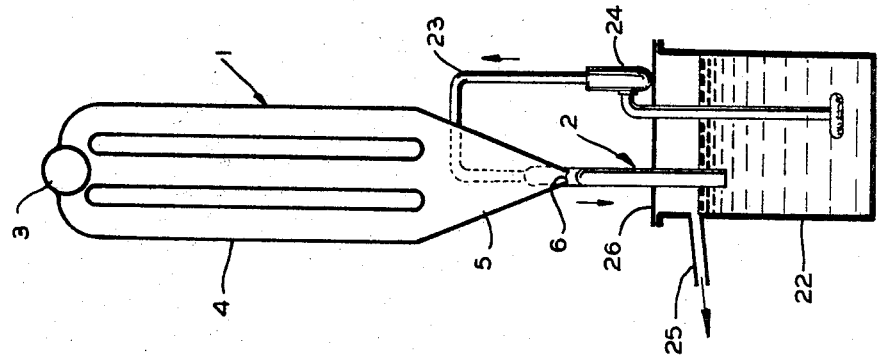

This invention relates to the production and recovery of phosphorus and is directly concerned with the recovery of phosphorus from gaseous streams containing the same by means of dry condensation.

In the production of elemental phosphorus by the thermal reduction of phosphate materials with a reducing agent, such as coke or other carbonaceous reducing agents, in the presence of a flux such as silica, the phosphorus-containing gases given off in the furnaces contain solid impurities such as particles of slag and unfused constituents of the charging materials which tend to be carried along with the phosphorus vapor when it is condensed to the liquid form as well as volatile constituents of the charging material which tend to form solid impurities during the condensation of the phosphorus vapor and thus contaminate the condensed liquid phosphorus.

Heretofore, it has generally been the practice to carry out the condensation of the phosphorus-containing gases by directly contacting such with a relatively cool condensing medium, usually water and containing, in some instances, such materials as dissolved ammonia, sodium hydroxide, sodium carbonate and the like. The conventional procedure is to spray the phosphorus-containing gases at a temperature below the dew point with the condensing medium. This procedure has several limitations among which include the formation of so-called "phossy-water" which not only reduces the recovery of phosphorus but also presents a problem as to disposal; the formation of so-called "sludge," a somewhat poorly defined emulsion or dispersion containing solid impurities, water and phosphorus, which again not only reduces the recovery of phosphorus but also presents a problem as to disposal; the requirement of pretreating the phosphorus-containing gases to remove at least some of the solid impurities, such as by use of electrostatic precipitators, before condensation; and the decrease in the fuel content of the exciting uncondensed gases (mostly carbon monoxide) by being relatively "wet" from the condensation when the by-product gas is used as a fuel.

As can be appreciated from the foregoing, a method for dry condensing the phosphorus-containing gases to recover the phosphorus therefrom would obviate or minimize the limitations of the hereinbefore described "wet" method of condensation. However, the dry condensation of the phosphorus in phosphorus-containing gases has received little attention due to such basic problems as maintaining the system isolated from oxygen (air), recovering the liquid phosphorus which may contain appreciable amounts of solid impurities as well as effecting an adequate separation of the condensed liquid phosphorus and the uncondensed gases.

It is, therefore, an object of the present invention to provide means for dry condensing the phosphorus in phosphorus-containing gases and recovering liquid phosphorus therefrom thereby realizing all the advantages which result from dry condensation as compared to "wet" condensation methods.

It is another object of the present invention to provide a method for dry condensing the phosphorus in phosphorus-containing gases and recovering liquid phosphorus therefrom which obviates or minimizes the hereinbefore discussed basic problems attendant with dry condensation.

It is a further object of the present invention to provide an apparatus for dry condensing the phosphorus in phosphorus-containing gases and recovering liquid phosphorus therefrom which obviates or minimizes the hereinbefore discussed basic problems attendant with dry condensation.

These objects as well as other objects and advantages will become apparent from a reading of the following detailed description.

The present invention, in general, pertains to a method for condensing gaseous phosphorus from a gaseous stream containing the same and solid impurities which comprises passing the gaseous stream to a condensing zone, indirectly cooling the gaseous stream in the condensing zone under temperature conditions sufficient to condense phosphorus vapor to liquid phosphorus and exiting liquid phosphorus from the condensing zone to a collecting zone wherein liquid phosphorus is moving under flow conditions sufficient to prevent any solid impurities contained therein from settling out of the liquid phosphorus and to minimize the exiting from the condensing zone of uncondensed gases along with the exiting liquid phosphorus, as well as an apparatus for carrying out the method, all of which will be more fully discussed hereinafter.

Figure 1:
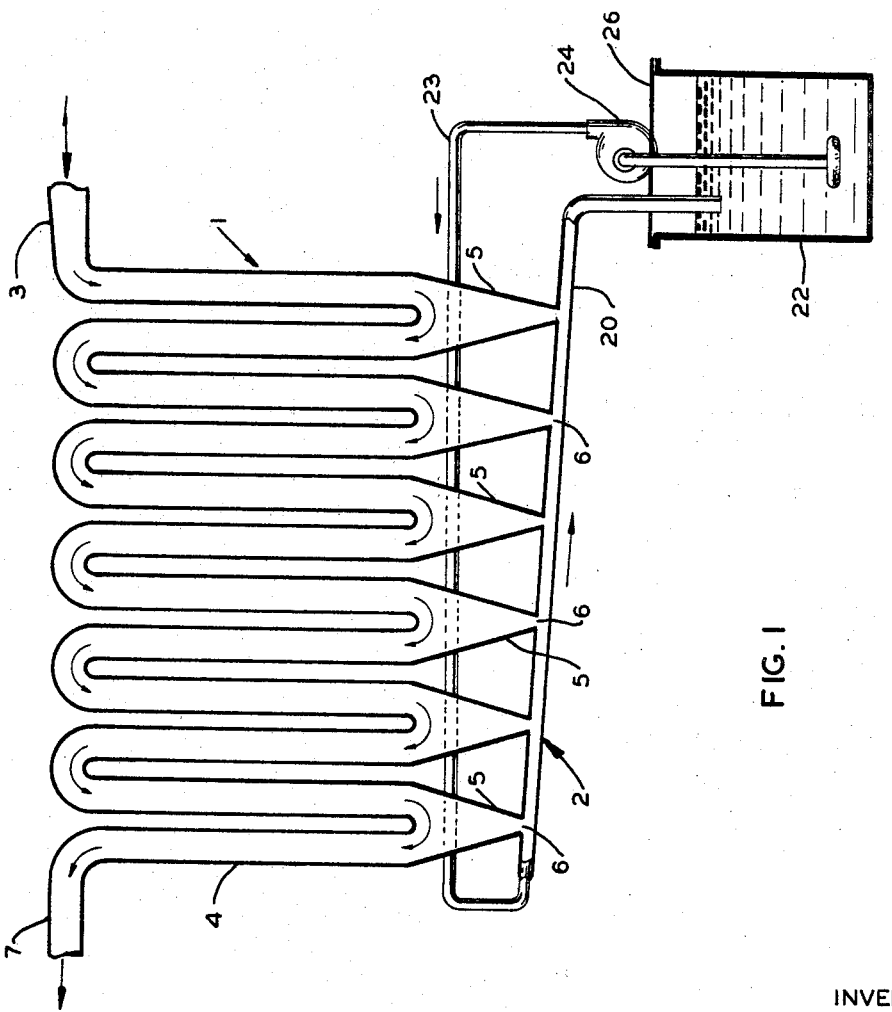

In order to facilitate the description and understanding of the present invention, reference is made to the appended drawings in which:

FIGURE 1 is a side elevation view, partially in section, of an apparatus embodying the concepts of the present invention, and FIGURE 2 is an end elevation view, partially in section, of an apparatus embodying the concepts of the present invention.

Referring now to FIGURES 1 and 2, an apparatus for the recovery of phosphorus from gaseous streams containing the same and solid impurities and embodying the concepts of the present invention is shown. The apparatus is comprised of, in general, a condensing zone 1 wherein the phosphorus-containing gases are indirectly cooled in order to condense the phosphorus vapor in the phosphorus-containing gases to liquid phosphorus (condensate) and a collecting zone 2 for recovering the liquid phosphorus (condensate) exiting from the condensing zone. Within the condensing zone are included an inlet passage 3 for the entering phosphorus-containing gases, a condenser tube 4 wherein the phosphorus gas in the phosphorus-containing gases is indirectly cooled to liquid phosphorous and a header 5 which is provided as a conduit for passing the uncondensed gases to another condenser tube and passing the liquid phosphorus to the outlet passage 6 for exiting the liquid phosphorus from the condensing zone. Although only a single condenser tube may be used or a plurality of tubes of different sizes and/or shapes, the condensing zone is preferably provided with a plurality of vertically aligned condenser tubes (as shown) arranged in a series of hairpin shapes with the headers acting as connecting means between individual tubes as well as acting as a conduit means as hereinbefore described. Also the condenser tubes can be arranged in a single row or a plurality of rows but are preferably arranged in a plurality of rows with the adjacently disposed tubes of the rows being interconnected at their inlet passage as well as by the headers to form a bank of hairpin shaped tubes (as shown 3 condenser tubes to a bank). Thus not only are the tubes within each row interconnected to adjacently disposed tubes within the row but they are also interconnected to adjacently disposed tubes in the other rows. Additionally, an outlet passage 7 is provided to exit the uncondensed gases from the condensing zone.

The collecting zone is provided with a header line or conduit 20 which interconnects the individual headers 5 to a tank 22 for holding a predetermined amount of the liquid phosphorus, a return line or conduit 23 which interconnects header line 20 with tank 22 and a means 24, such as a pump, provided to move the liquid phosphorus through return line 23 and header line 20, thus recirculating at least a portion of the liquid phosphorus in the collecting zone via the recycle line (header line and return line). Tank 22 is provided with a top closure 26 for sealing the liquid phosphorus therein from access to oxygen (air). The header line 20 when interconnecting two or more headers is preferably inclined from the horizontal such that the line slopes toward the tank thus aiding in passing the liquid phosphorus through the header line. Although any degree of slope can be used only relatively small slopes are usually sufficient and therefore preferred, that is, slopes of from about ½° (30″) to about 10° from the horizontal. The header line can vary in size although it is preferred that the size be such as to permit the line to be maintained at least about ¼ full and especially preferred from about ¼ full to about ¾ full of the liquid phosphorus. In addition, the header line 20 when interconnecting two or more headers 5 can be, if desired, of varying diameters such that the diameter of the line increases as the number of headers interconnected therewith increase so that the portion of the header line between successive headers is capable of handling or passing the liquid phosphorus collected from headers connected to the header line ahead of such portion of the header line. The tank 22 is provided with an outlet passage 25 for passing liquid phosphorus therefrom for further processing and/or use and thus enabling a predetermined amount of liquid phosphorus to be kept in tank 22.

The entire system, that is, the condensing zone and the collecting zone, should be closed to prevent or minimize exposure of the phosphorus to oxygen in air. This is readily achieved in the condensing zone since the phosphorus-containing gases are indirectly cooled and in the collecting zone by maintaining the system of recirculating liquid phosphorus and tank means closed to the atmosphere.

In operation, phosphorus-containing gases produced, for example, in an electric furnace and, if desired, although such is not usually required, passed through process stages, such as electrostatic precipitators which remove from the gases to various degrees some of the particulate impurities, are directed to the inlet passage 3 of the condensing zone. The phosphorus-containing gases can vary in composition, however, usually such gases contain, in addition to phosphorus gas, a major amount, i.e., over about 50% by volume, of carbon monoxide and a minor of such materials as particulate impurities, methane, hydrogen, silicon tetrafluoride and the like. It is not uncommon for the phosphorus-containing gases to contain from about 1% to 15% by volume of phosphorus and as much as 75% to 90% by volume of carbon monoxide. The phosphorus-containing gases pass from the inlet passage 3 into the condenser tubes 4 and are indirectly cooled, by such means as passing or circulating a cooling medium, for example, air, water and the like, around the tubes, to a temperature below the dew point of phosphorus but above the melting point of phosphorus (from about 60° C. to 180° C.) in order to condense at least a portion of the phosphorus gas to liquid phosphorus. In this condensation process there is usually a small but appreciable amount of the solid impurities, generally ranging from about .5% to 10% by weight of the liquid phosphorus, which tend to enter the liquid phosphorus phase (condensate phase) during or after this phase has formed and thus tend to become an impurity or contaminate in the liquid phosphorous. Although the phosphorus-containing gases are being indirectly cooled in the first few condenser tubes, in some cases there may be little, if any, liquid phosphorus condensed therein but relatively large amounts of solid impurities may come out of the gas and pass via the header into the collecting zone while the major amount of the phosphorus is condensed in the remaining condenser tubes with relatively small amounts of solid impurities contained therein. The liquid condensate formed in the condenser tubes 4 passes into the headers 5 along with the uncondensed gases. The uncondensed gases after being passed through a succession of condenser tubes 4 are exited from the condensing zone for further processing and/or use as a fuel source. From the headers 5 the liquid phosphorus is exited via outlet passage 6 into the header line 20 of the condensing zone in which liquid phosphorus is being passed. The liquid phosphorus is passed in the header line 20 under flow conditions such that the exiting liquid phosphorus is exited from the headers 5 without any appreciable delay or stagnation, thus minimizing the tendency of solid impurities usually found in the liquid phosphorus from settling out and/or clogging or interfering with the flow of the exiting liquid phosphorus. This appears to be especially important since the solid impurities tend to settle out of the liquid phosphorus and form a separate phase in a relatively short time. The flow conditions of the recirculating liquid phosphorus in the header line can vary depending upon, inter alia, the size and shape of the condenser tubes, headers, header line and the like as well as the amount of phosphorus contained in the phosphorus-containing gases and the volume throughput of the phosphorus-containing gases in the apparatus. Such flow conditions are dependent on various factors among which include:

(1) The need to maintain adequate flow through the system, preferably turbulent flow.

(2) The need to maintain a sufficient volume of flow in the header line to minimize the escape or flow of the uncondensed gases from the headers along with the exiting liquid phosphorus thus minimizing short circuiting or by-passing of the uncondensed gas between headers which could result in a lowering of efficiency of the apparatus and/or seriously interfere with its functioning.

(3) The need to provide a header line of sufficient size and/or slope to prevent plugging by pieces of solid impurities or scale being passed therethrough.

The liquid phosphorus is preferably passed through the header line 20 under turbulent flow conditions, and thus tend to prevent concentration of the solid impurities in the line by either floating or sinking, which may tend to occur if the flow is nonturbulent or laminar. Turbulent flow conditions can be expressed as any flow in a relatively straight and smooth pipe which has a Reynolds' number ($R_e$) greater than about 2200 where $R_e = DUP/\mu$ and
$D$ = inside diameter of pipe (ft.)
$U$ = average velocity of fluid (ft. per sec.)
$P$ = density of fluid (lb. per cu. ft.)
$\mu$ = viscosity of fluid (lb. per ft./sec.)

When the liquid phosphorus stream reaches the tank 22, a portion thereof is recycled back to the header line 20 via the return line 23 and a portion is passed out of the tank 22 via outlet passage 25 for further processing and/or use, thus maintaining a predetermined amount of the liquid phosphorus in the tank.

The amount of recycle liquid phosphorus can vary but, in general, an amount sufficient to maintain the flow in the header line under turbulent flow conditions without permitting the level of liquid phosphorus to rise into the headers is desired. Preferably the liquid phosphorus is recycled in the lines in an amount in excess of the amount of the exiting liquid phosphorus from the condensing zone (condensate), such as from an amount about equal to the condensate to about 30 or 40 times such an amount. Especially preferred are amounts from about 5 to 20 times the amount of condensate. The lower limit of the amount of recycle will, in general, depend on the amount of solid impurities contained in the liquid phosphorus and on the nature of such, i.e., whether it contains lumps or agglomerates, which may cause plugging in the recycle lines. The upper limit of the amount of recycle is of concern primarily due to the cost of power and equipment for pumping the liquid phosphorus in large volumes, although it is preferred to maintain the recycle flow in relatively large amounts to minimize the risk of plugging the recycle lines but there is no fixed quantity of recycle which, when the lines are of predetermined size and slope, can be said to be excessive from the viewpoint of carrying out the present invention.

What is claimed is:

1. A method for condensing gaseous phosphorus from a gaseous stream containing the same and solid impurities which comprise passing said gaseous stream to a condensing zone, indirectly cooling said gaseous stream in said condensing zone under temperature conditions sufficient to condense phosphorus gas to liquid phosphorus, exiting uncondensed gases from said condensing zone, and exiting liquid phosphorus from said condensing zone into a turbulently flowing recycle stream of liquid phosphorus.

2. The method of claim 1, wherein the amount of said liquid phosphorus recycled in said recycle stream is in excess of the amount of said exiting liquid phosphorus.

References Cited

UNITED STATES PATENTS

| 1,788,838 | 1/1931 | Lang | 55—73 |
| 1,841,071 | 1/1932 | Waggaman | 23—223 |
| 2,062,091 | 11/1936 | Gooch | 23—223 |
| 2,117,301 | 5/1938 | Curtis | 23—223 |
| 3,068,070 | 12/1962 | Felch | 23—223 |
| 3,053,637 | 9/1962 | Williams | 23—294 |
| 3,084,029 | 4/1963 | Barber | 23—293 |
| 3,104,952 | 9/1963 | Hartig | 23—293 |
| 306,832 | 10/1884 | Houghton | 202—186 |
| 736,625 | 8/1903 | Du Pont | 202—186 |
| 319,971 | 6/1885 | Giebermann | 202—186 |
| 286,448 | 10/1883 | Laist | 202—186 |

NORMAN YUDKOFF, *Primary Examiner.*

G. P. HINES, *Assistant Examiner.*

US. Cl. X.R.

23—223; 202—202, 186